(12) United States Patent
Hiller et al.

(10) Patent No.: US 12,259,103 B2
(45) Date of Patent: Mar. 25, 2025

(54) HEADLAMP FOR VEHICLES

(71) Applicant: Hella GmbH & Co. KGaA, Lippstadt (DE)

(72) Inventors: Lukas Hiller, Lippstadt (DE); Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/410,622

(22) Filed: Jan. 11, 2024

(65) Prior Publication Data

US 2024/0142077 A1 May 2, 2024

Related U.S. Application Data

(63) Continuation of application No. PCT/EP2022/069234, filed on Jul. 11, 2022.

(30) Foreign Application Priority Data

Jul. 12, 2021 (DE) .......................... 102021117908.4

(51) Int. Cl.
*F21S 41/50* (2018.01)
*F21S 41/143* (2018.01)
*F21S 41/25* (2018.01)
*F21S 41/663* (2018.01)
*F21S 41/683* (2018.01)
*F21W 102/13* (2018.01)
*F21W 103/20* (2018.01)

(52) U.S. Cl.
CPC ............. *F21S 41/50* (2018.01); *F21S 41/143* (2018.01); *F21S 41/25* (2018.01); *F21S 41/663* (2018.01); *F21S 41/683* (2018.01); *F21W 2102/13* (2018.01); *F21W 2103/20* (2018.01)

(58) Field of Classification Search
CPC .......... F21S 41/50; F21S 41/143; F21S 41/25; F21S 41/663; F21S 41/683; F21W 2102/13; F21W 2103/20
See application file for complete search history.

(56) References Cited

U.S. PATENT DOCUMENTS

2019/0129360 A1* 5/2019 Karthaus ................. F21S 41/16
2019/0160996 A1 5/2019 Nishio et al.

FOREIGN PATENT DOCUMENTS

| DE | 102014119326 A1 | 6/2016 |
|----|----|----|
| DE | 102015115128 A1 | 3/2017 |
| DE | 102016107307 A1 | 10/2017 |
| DE | 102017124296 A1 | 4/2019 |
| DE | 102019204295 A1 | 10/2020 |

(Continued)

*Primary Examiner* — Elmito Breval
(74) *Attorney, Agent, or Firm* — Husch Blackwell LLP

(57) ABSTRACT

A headlamp for vehicles is provided with a light source unit containing numerous light sources, and with a hologram unit containing numerous hologram segments for generating a predefined light distribution. Each of the hologram segments has at least one dedicated light source. The hologram segments are reflection hologram segments behind the respective dedicated light sources in the direction light is emitted by the headlamp, which light from the light sources strikes them at an acute angle and is reflected in the light emission direction in accordance with the holographic diffraction information stored in the respective reflection hologram segments.

11 Claims, 4 Drawing Sheets

(56) References Cited

FOREIGN PATENT DOCUMENTS

| | | |
|---|---|---|
| DE | 102019111647 A1 | 11/2020 |
| DE | 102019122318 A1 | 2/2021 |
| DE | 102020100120 A1 | 7/2021 |
| EP | 1452795 A2 | 9/2004 |
| EP | 3216652 A1 | 9/2017 |
| JP | 2018156836 A | 10/2018 |
| WO | 2020101070 A1 | 5/2020 |
| WO | 2020189830 A1 | 9/2020 |

* cited by examiner

HEADLAMP FOR VEHICLES

CROSS REFERENCE

This application claims priority to PCT Application No. PCT/EP2022/069234, filed Jul. 11, 2022, which itself claims priority to German Application No. 10 2021 117908.4, filed Jul. 12, 2021, the entireties of both of which are hereby incorporated by reference.

FIELD OF THE INVENTION

The invention relates to a headlamp for vehicles that has a light source unit containing numerous light sources and a hologram unit containing numerous hologram segments for generating a predefined light distribution, in which each of the hologram segments has at least one dedicated light source.

BACKGROUND OF THE INVENTION

DE 10 2016 107 307 A1 discloses a headlamp for vehicles that has a light source unit and a hologram unit for generating a predefined light distribution. The hologram unit comprises numerous hologram segments in a plane. The hologram segments are transmission hologram segments that contain diffraction information, such that the light from the respective light sources is diffracted in a transmissive manner, resulting in a predefined light distribution that is generated by superimposing the light diffracted by the hologram segments. The disadvantage with this headlamp is that the hologram segments must be aligned with one another to generate the predefined light distribution. Moreover, the light sources can be seen when the headlamp is not on, which is unattractive.

DE 10 2019 111 647 A1 discloses a headlamp for vehicles comprising a light source unit and a transmissive hologram unit.

BRIEF SUMMARY OF THE INVENTION

The object of the present invention is to improve on a headlamp for vehicles that makes use of hologram elements, which is more effective and requires less space, in particular vertically.

To solve this problem, the hologram segments are reflection hologram segments behind their respective dedicated light sources in the direction light is emitted from the headlamp, at which light from the light sources strikes at an acute angle and is reflected in the light emission direction in accordance with to the holographic diffraction information stored in the respective reflection hologram segments.

The hologram segments used for the invention are reflection hologram segments, with which a very compact headlamp housing can be obtained. Only the reflection hologram elements are placed parallel to the cover panel for the headlamp housing, such that they can be seen from the outside, while the dedicated light sources are above, below, or to the side of the reflection hologram segments. Consequently, the height and depth of the headlamp housing can advantageously be reduced. Moreover, the light sources are not visible from the outside if the reflection hologram segments are transparent. According to a preferred embodiment of the invention, the reflection hologram segments are in a row along the direction of extension, wherein at least some of the reflection hologram segments are at an angle to one another and not in the same plane. This can advantageously result in a wider or narrower light beam.

According to one embodiment of the invention, numerous reflection hologram segments and their dedicated light sources form a hologram module with which a light distribution or part of a light distribution is generated. By combining numerous hologram modules, different light distributions can be generated.

According to one embodiment of the invention, a first hologram module can generate a first partial light distribution and a second hologram module can generate a second partial light distribution, such that the predefined light distribution is generated by superimposing the first and second partial light distributions. In particular, the first hologram module can be in the left-hand headlamp and the second hologram module can be in the right-hand headlamp, or vice versa, such that an asymmetrical light emission is obtained from the two headlamps. Consequently, the low beam light distribution can be generated without requiring as much space, such that the headlamp housing can be smaller.

According to one embodiment of the invention, the hologram module is an individual hologram module with just one reflection hologram segment and one dedicated light source. Advantageously, the reflection hologram segments can be distributed in the headlamp housing better, thus making optimal use of the available space therein.

According to one embodiment of the invention, a screen is placed between the reflection hologram segments and the light sources, such that the light sources are concealed even when looking down on the headlamp at a steep angle.

According to one embodiment of the invention, the reflection hologram segments have at least two dedicated light sources, which are at different angles to the surface of the reflection hologram segments, and different diffraction information is stored in the reflection hologram segments for generating different light distributions, such that different light distributions can be generated by switching on different light sources. Consequently, a low beam light distribution and a high beam light distribution, or a low beam light distribution and a turn signal, can be advantageously generated without requiring as much space.

According to one embodiment of the invention, the light sources for the hologram modules are all on the same substrate, and the different light sources emit light of different colors, such that different light distributions can be generated through the interaction with the diffraction information stored in the reflection hologram segments. Advantageously, different light distributions can be generated by this means without requiring as much space.

According to one embodiment of the invention, the hologram module can rotate about an axis such that the light can be pivoted when traveling through a curve, or dimmed to accommodate oncoming traffic when the high beam light distribution is activated.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
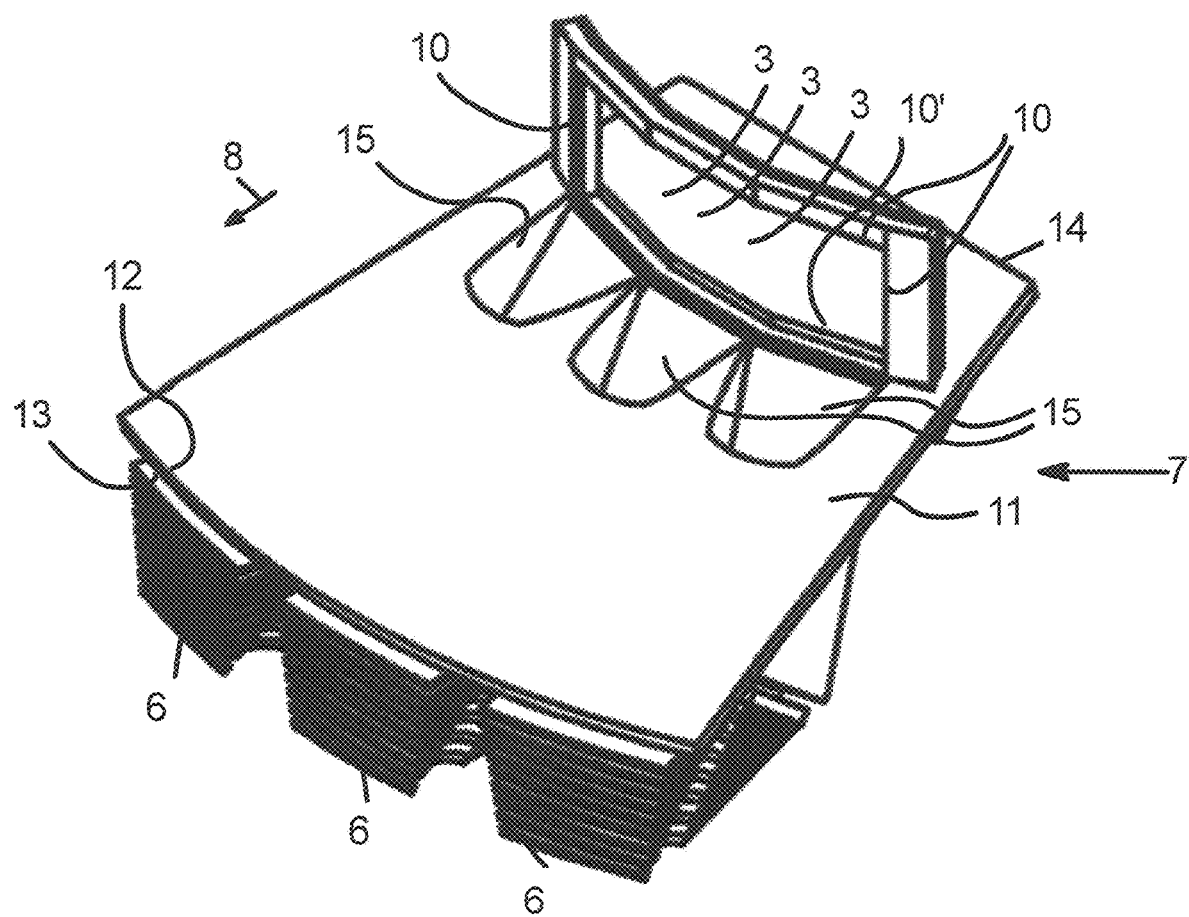
FIG. 1 shows a perspective front view of a headlamp according to a first embodiment of the invention.
Figure 2:
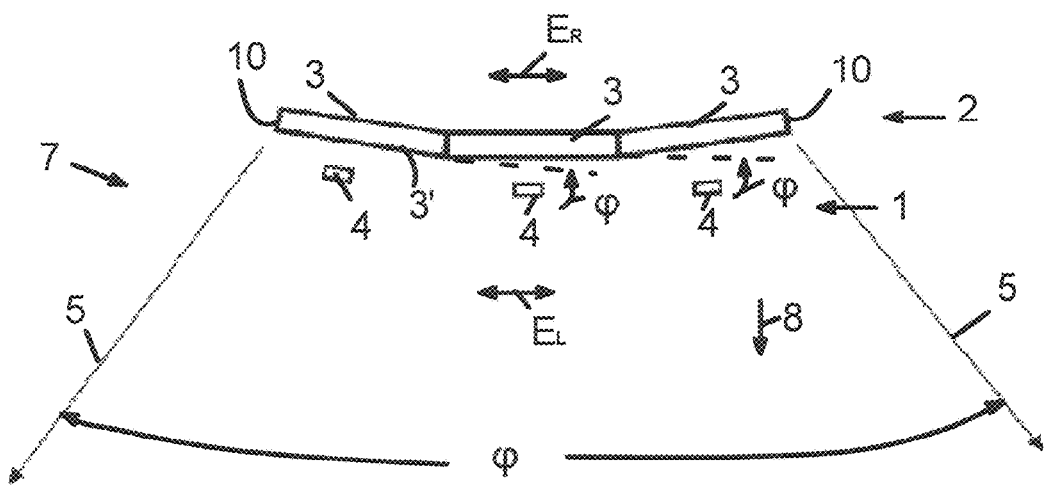
FIG. 2 shows schematic view of a first embodiment of the light source unit and the hologram unit in the headlamp from above.

Vehicle headlamps are used to generate low beam light distributions and high beam light distributions. The headlamp has a housing that opens toward the front, with a transparent cover panel, not shown. The housing contains a light source unit 1 and a hologram unit 2, with the hologram unit 2 comprising numerous reflection hologram segments 3. There are three reflection hologram segments 3 in a row along a direction of extension $E_R$ in the exemplary embodiment shown in FIGS. 1 and 2, each of which has a dedicated light source 4 in the light source unit 1. The light sources 4 are spaced apart along a direction of extension $E_L$, which is substantially parallel to the direction of extension $E_R$ for the reflection hologram segments 3.

In the present exemplary embodiment, the reflection hologram segments 3 follow a convex curve, such that in the plane of the direction of extension $E_R$, the hologram unit 2 can emit light 5 with a wide beamwidth γ. Alternatively, the hologram unit 2 can also follow a different curve, such that the beamwidth γ at which the light 5 is emitted is narrower than if the reflection hologram segments 3 were in a straight row.

The reflection hologram segments 3 are integrally connected to one another. These adjacent reflection hologram segments 3 converge to an acute angle cp.

The light sources 4 are each placed on a substrate (printed circuit board) that is connected to a heat sink 6 on the other side. The hologram unit 2 and light source unit 1 shown in FIG. 2 collectively form a hologram module 7 with which a low beam light distribution can be generated, for example. The reflection hologram segments 3 are behind the light sources 4 in the direction 8 light is emitted from the headlamp. In the present exemplary embodiment, the light sources 4 are beneath the reflection hologram segments 3. The light sources 4 are arranged in a plane that is perpendicular to the reflection hologram segments 3, which extends beyond the edge of the reflection hologram segments 3. There is a screen 11 between this plane along which the light sources 4 extend and a lower edge 10' of the reflection hologram segments 3, or the hologram unit 2, which is preferably opaque, e.g. forming a reflective surface. A front edge 12 of the screen 11 is flush with the edge 13 of the heat sink 6 facing away from the printed circuit board, while a rear edge 14 of the screen 11 extends toward the rear in the light emission direction 8 to the reflection hologram segments 2.

The screen 11 has perforations 15 for each of the light sources 4, such that the light from the light sources 4 can strike the respective reflection hologram segments 3, or a front surface 3' of the reflection hologram segments 3 at an acute angle. The upright, or vertical reflection hologram segments 3 in the present exemplary embodiment contain the holographic diffraction information, such that the light from the light sources 4 is reflected in the light emission direction 8. The screen 11 hides the light sources 4 and the heat sink 6 from view from the outside. The reflection hologram segments 3 are preferably formed by a transparent film. The visible interior of the headlamp housing is therefore characterized or determined by the design of the surface on the inside of the housing.

Figure 3:
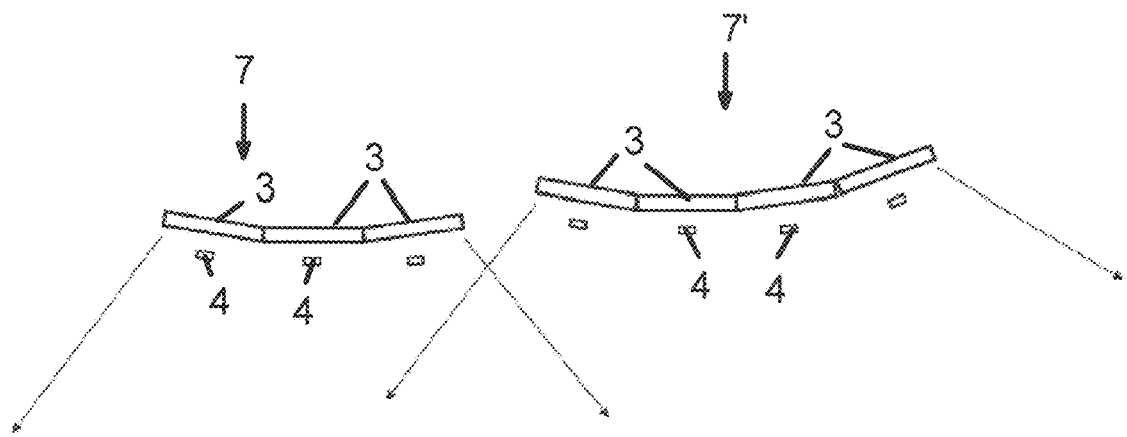
FIG. 3 shows a schematic view of a second embodiment of the headlamp from above.

According to a second embodiment of the invention shown in FIG. 3, there can be a second hologram module 7' in addition to the hologram module 7 described above, which is composed of a large number of reflection hologram segments 3 and a large number of light sources 4. The hologram module 7' in this exemplary embodiment contains four reflection hologram segments 3 and four light sources 4, such that each reflection hologram segment 3 has one dedicated light source 4.

When the hologram units 2 in the hologram module 7 are in a single plane, the dedicated light sources 4 can also be in a single plane, and therefore on the same substrate.

Figure 4:
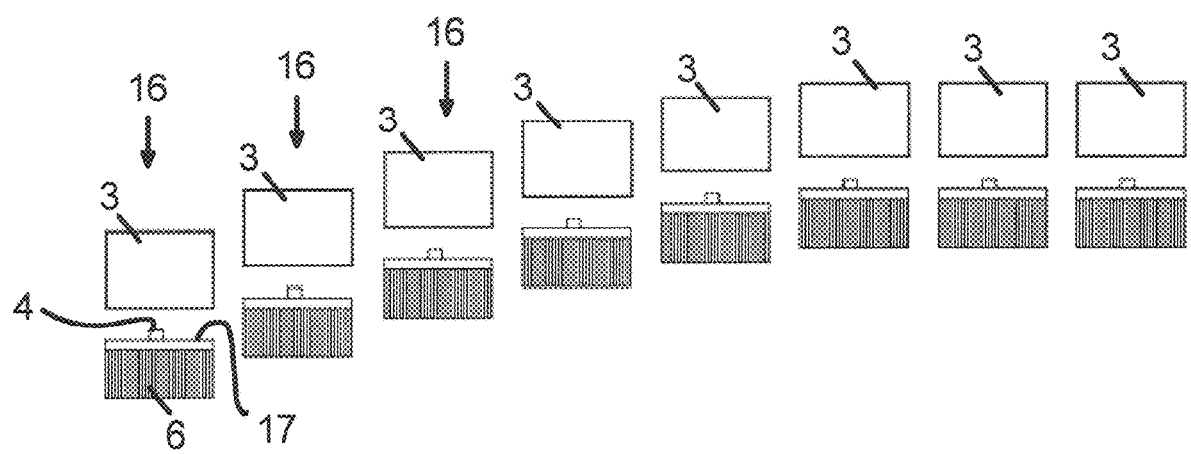
FIG. 4 shows a schematic view of a third embodiment of the headlamp from above, with numerous individual hologram modules.

According to another embodiment of the invention, shown in FIG. 4, the hologram module 7 is an individual hologram module 16, comprising a single reflection hologram segment 3 and a single light source 4. The light sources 4 are on a separate substrate 17, with the heat sink 6 for the individual hologram module 16 on the side facing away from the light source 4. This individual hologram module 16 can correspond to the shape of the edge of the headlamp housing, such that the headlamp can be particularly flat. The headlamp housing for the embodiment shown in FIG. 4 can extend along a horizontal plane, with a limited depth.

Figure 5:
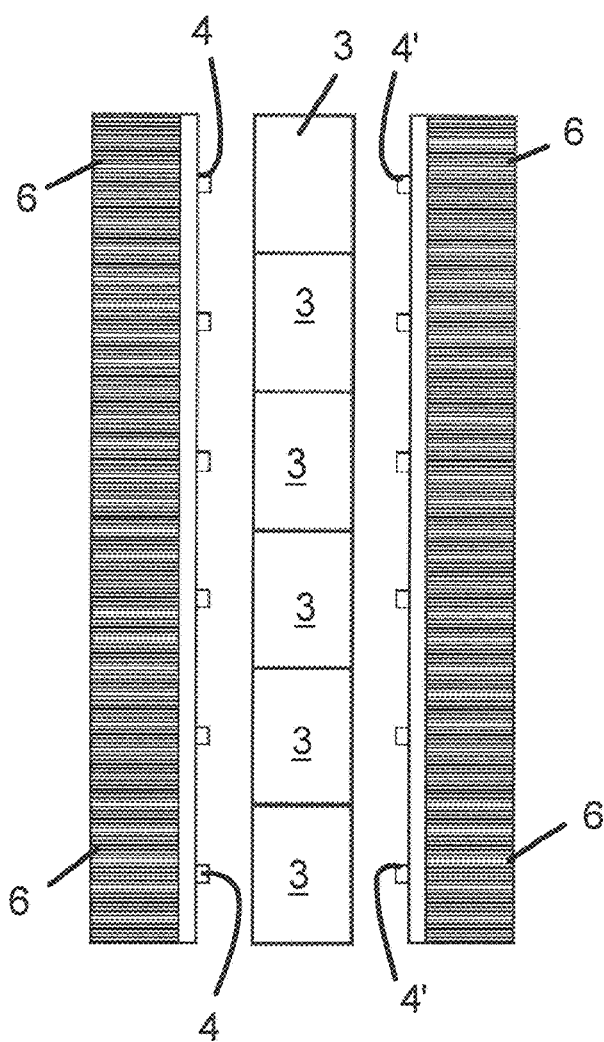
FIG. 5 shows a vertical structure of a hologram module from the front, with light supplied from both sides.

According to an alternative embodiment of the invention shown in FIG. 5, the headlamp housing can be relatively flat and extend in a vertical plane, in which, unlike the embodiment shown in FIG. 4, each reflection hologram segment 3 has two different light sources 4, 4'. The one light source 4 is on one side of the row of reflection hologram segments 3 and the other light source 4' is on the other side. The light sources 4, 4' are arranged symmetrically to the respective reflection hologram segments 3, such that the light from the light sources 4, 4' strikes the surface of the reflection hologram segments at the same, but mirror-reversed, angle. The reflection hologram segments 3 preferably have flat surfaces. According to another embodiment, these surfaces of the reflection hologram segments 3 can also be slightly curved.

According to an alternative embodiment of the invention shown in FIG. 5, not shown herein, the light sources 4, 4' can be at different angles to the same reflection hologram segment 3 such that the light they emit strikes the reflection hologram segment 3 at different angles.

According to another embodiment of the invention, not shown herein, a first hologram module 7 can generate a first partial light distribution, and a second hologram module 7' can generate a second partial light distribution. The first partial light distribution and second partial light distribution can be superimposed to obtain a predefined light distribution, e.g. a low beam light distribution. By way of example, the first hologram module 7 can be placed in the left-hand headlamp, and the second hologram module 7' can be placed in the right-hand headlamp, or vice versa. This advantageously further reduces the necessary installation space for the headlamp, if the light sources 4 emit a stronger luminous flux.

Figure 6:
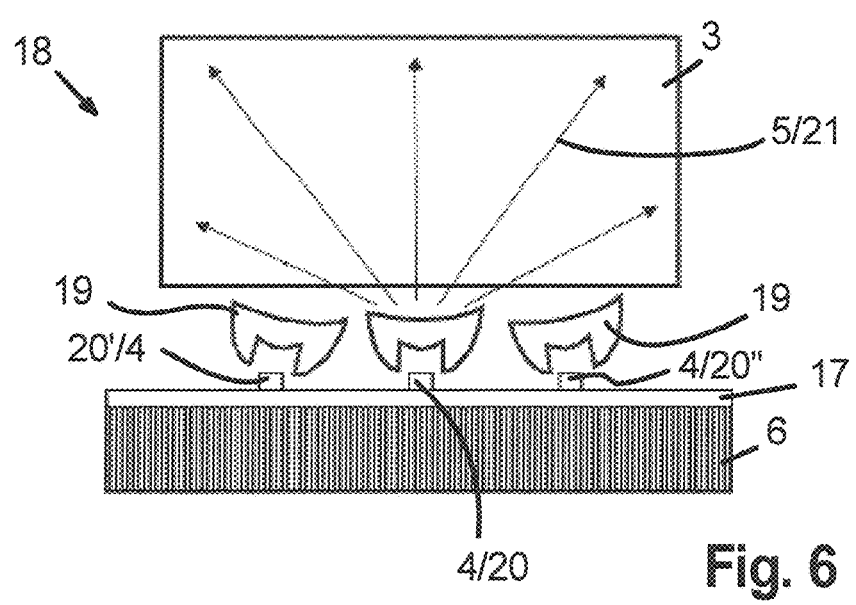
FIG. 6 shows a schematic illustration of an individual hologram module with numerous light sources.

According to another embodiment of the invention, shown in FIG. 6, a hologram module 18 comprises a single reflection hologram segment 3 with numerous dedicated light sources 4 on a single substrate 17. The light sources 4 each have primary lenses 19 in front of them, which focus the light form the light sources 4 in a predominant direction that differs from that of the other light sources. The substrate 17 is flat, i.e. the light sources 4 are all on the same plane. These primary lenses 19 change the angle at which the light 5 from the light sources 4 strikes the single reflection hologram segment 3. If, for example, the light source 20 in the middle emits yellow light, and the reflection hologram segment 3 contains diffraction information with which the light 21 from the middle light source 20 is reflected to obtain a turn signal, a first light function can be obtained therewith. If a light source 20' on the right, and a light source 20" on the left emit white light, and the reflection hologram segment 3 contains diffraction information with which a low beam light distribution is obtained from the light emitted by the light sources 20', 20", a second light distribution can be generated with the same hologram module 18.

The hologram module 18 for generating these light functions can be made even more compact if the middle light source 20' emits white light, for example, such that a low beam light distribution is generated by the interaction with the reflection hologram segment 3, the light source 20" on the left emits yellow light, such that a turn signal is generated by the interaction with the reflection hologram segment 3, and the light source 20''' on the right emits blue or green light, such that a welcome/farewell function is generated by the interaction with the reflection hologram segment 3. Consequently, three different light functions, or distributions, can be generated.

The light sources 20, 20', 20" could also be used to generate different images, thus generating a three-dimensional image.

This results in a holographic image composed of numerous spatially offset images.

Figure 7:
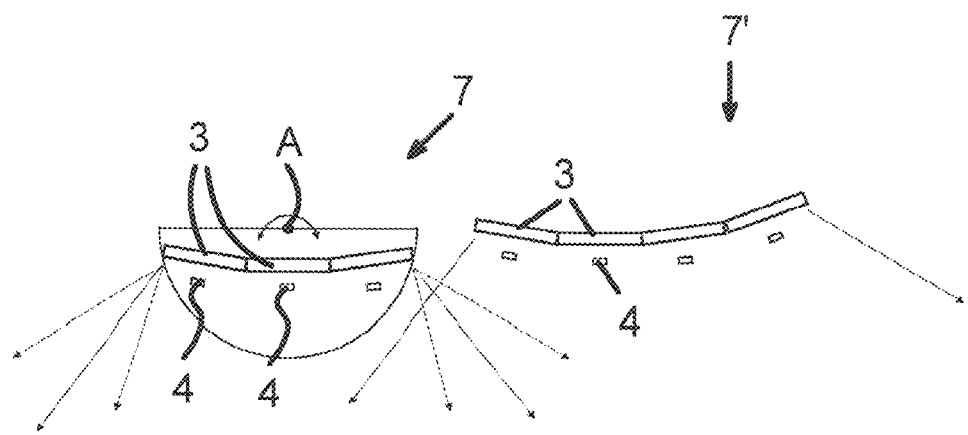
FIG. 7 shows two hologram modules, one of which can pivot.

According to another embodiment of the invention shown in FIG. 7, the hologram module 7 can also pivot about an axis A, such that a cornering light function can be generated. If the hologram modules 7, 7' on the right and left sides can pivot about a vertical axis A, a tunnel can be formed between them to avoid blinding oncoming traffic.

The light sources 4 can be LED light sources or laser light sources.

LIST OF REFERENCE SYMBOLS 1 light source unit
2 hologram unit
3, 3' reflection hologram segment
4, 4' light source
5 light
6 heat sink
7, 7' hologram module
8 direction of light emission
10, 10' edge
11 screen
12 front edge
13 edge
14 rear edge
15 perforation
16 individual hologram module
17 substrate
18 hologram module
19 primary lens
20, 20', 20" light sources
21 light
φ angle
γ aperture angle
A pivot axis

The invention claimed is:

1. A headlamp for vehicles, the headlamp comprising:
   a light source unit containing one or more light sources; and
   a hologram unit containing one or more hologram segments for generating a predefined light distribution,
   wherein each of the hologram segments has at least two dedicated light sources, the light sources oriented at different angles to the surface of the associated hologram segment,
   wherein each hologram segment is a reflection hologram segment behind its respective dedicated light source in a direction light is emitted from the headlamp, which light from the light sources strikes the hologram segment at an acute angle and is reflected in the light emission direction in accordance with holographic diffraction information stored in the respective reflection hologram segments,
   wherein the reflection hologram segments and the respective light sources dedicated thereto form a hologram module for generating a low beam light distribution and/or a high beam light distribution,
   wherein different diffraction information for generating different light distributions is stored in each of the reflection hologram segments,
   wherein the light sources for the hologram module are all on the same substrate, and
   wherein:
      a light source in the middle emits yellow light, such that light for generating a turn signal is reflected by the reflection hologram segment, and a light source on the left and a light source on the right emit white light, such that light for generating a low beam light distribution is reflected by the same reflection hologram segment, or
      the light source in the middle emits white light, such that light for generating the low beam light distribution is reflected by the reflection hologram segment, and the light source on the left emits yellow light, such that light for generating a turn signal is reflected by the reflection hologram segment, and the light source on the right emits blue or green light, such that light for generating a welcome/farewell light function is reflected by the reflection hologram segment.

2. The headlamp according to claim 1, wherein the reflection hologram segments form a row in a direction of extension (ER), wherein at least some of the reflection hologram segments are at an angle to one another.

3. The headlamp according to claim 1, wherein the reflection hologram segments are arranged in a convex and/or concave shape along a direction of extension (ER).

4. The headlamp according to claim 1, wherein a first hologram module generates a first partial light distribution and a second hologram module generates a second partial light distribution, such that the predefined light distribution is generated by superimposing the first partial light distribution and the second partial light distribution.

5. The headlamp according to claim 1, wherein the hologram module forms an individual hologram module with a single reflection hologram segment and a single dedicated light source, and the individual hologram module is placed such that it corresponds to an edge of a headlamp housing.

6. The headlamp according to claim 1, wherein the light sources are placed in a plane of extension (EL) that is perpendicular to the reflection hologram segments, and extends beyond an edge of the reflection hologram segments to which they are dedicated.

7. The headlamp according to claim 6, wherein a screen with perforations through which the light from the light source passes to the reflection hologram segments is located in a plane that is perpendicular to the row of reflection hologram segments and is located between the plane of extension for the light sources and a lower edge of the reflection hologram segments.

8. The headlamp according to claim 1, wherein the light from the light sources is reflected by the same reflection hologram segments to obtain numerous light images that are offset to one another to form a holographic image.

9. The headlamp according to claim 1, wherein the hologram module can rotate about an axis (A).

10. The headlamp according to claim 1, wherein the light sources are LED light sources or laser light sources.

11. The headlamp according to claim 1, wherein numerous hologram modules and/or individual hologram modules are placed in the same headlamp housing.

\* \* \* \* \*